E. D. ANDERSON.
PACKING AND WRAPPING MACHINE.
APPLICATION FILED DEC. 29, 1913.
1,151,233.
Patented Aug. 24, 1915.
12 SHEETS—SHEET 3.
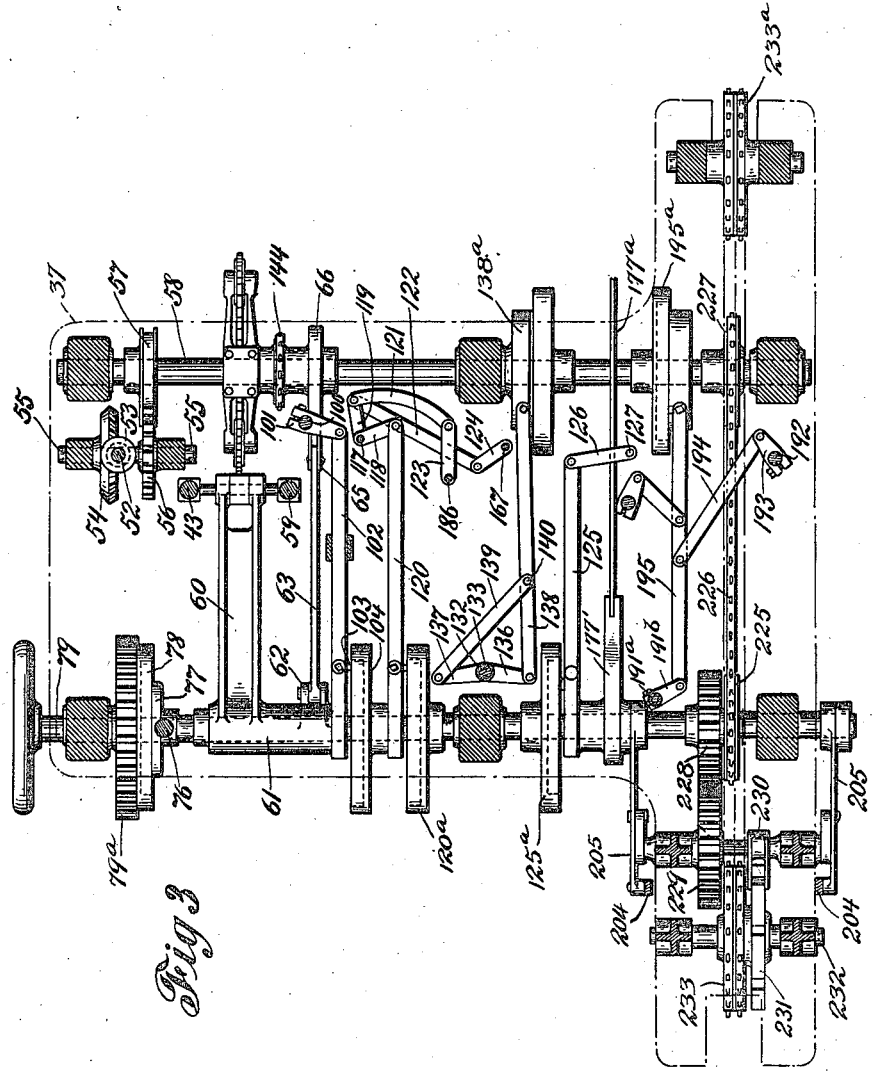
WITNESSES:
INVENTOR
BY
ATTORNEY

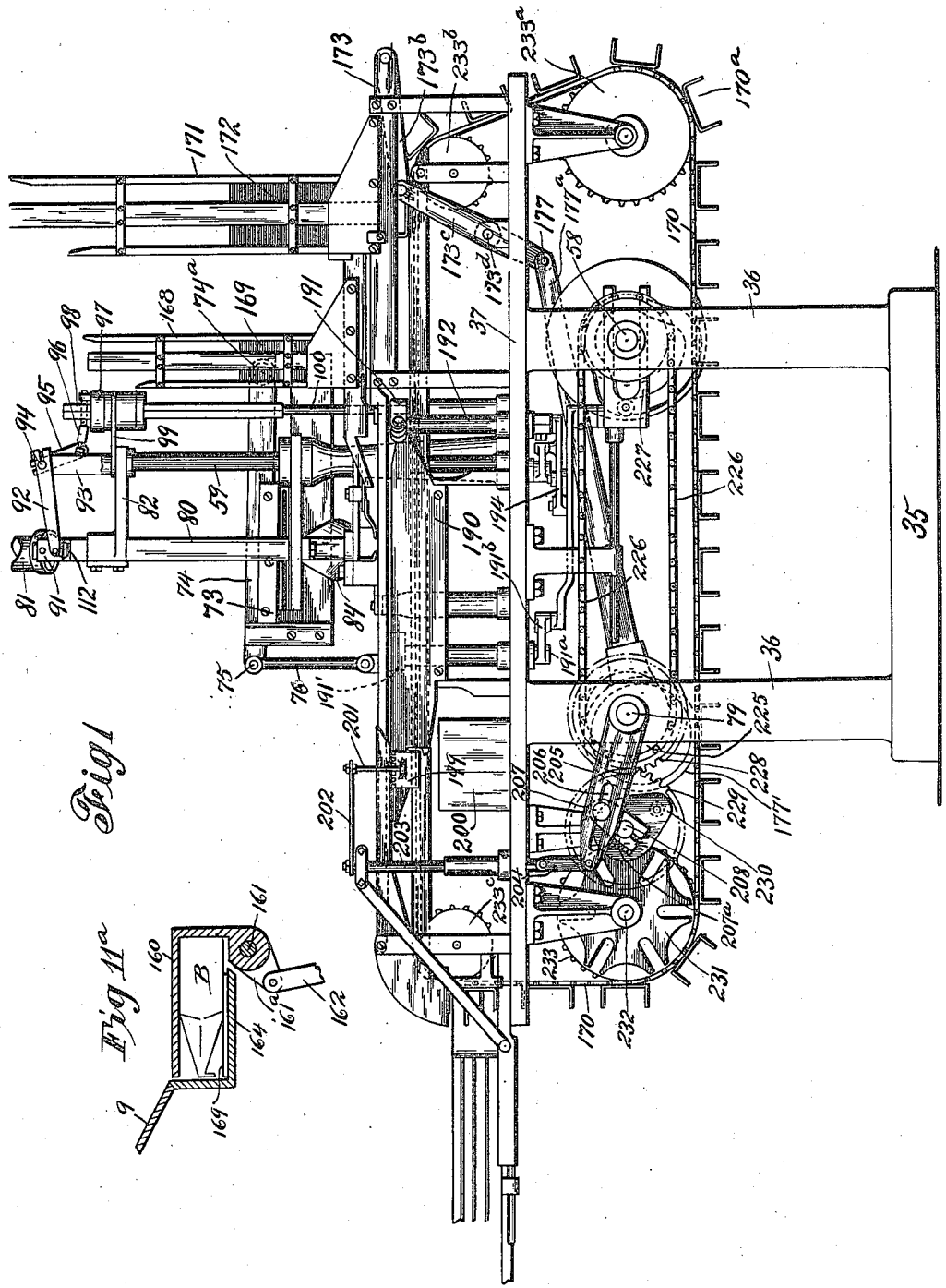

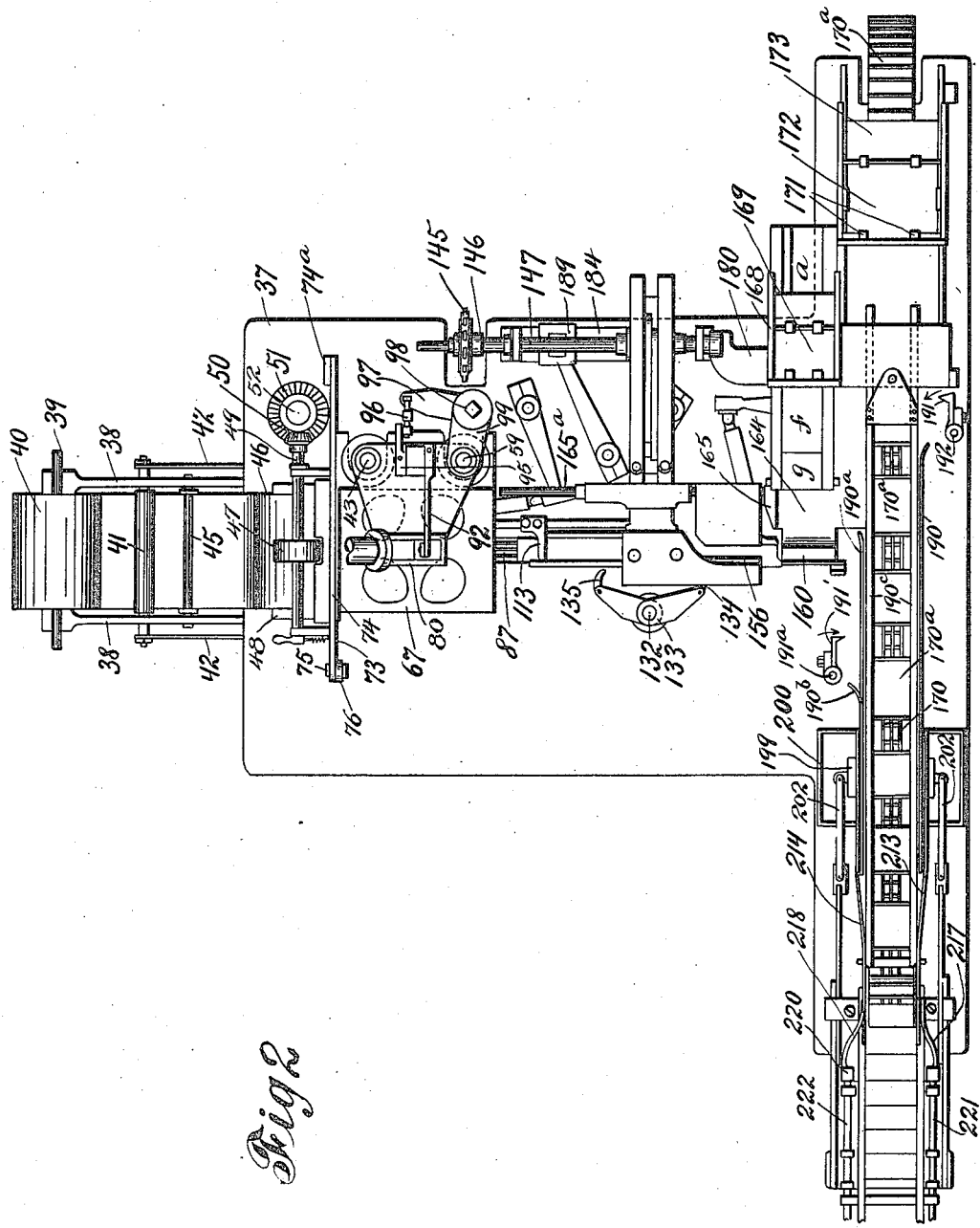

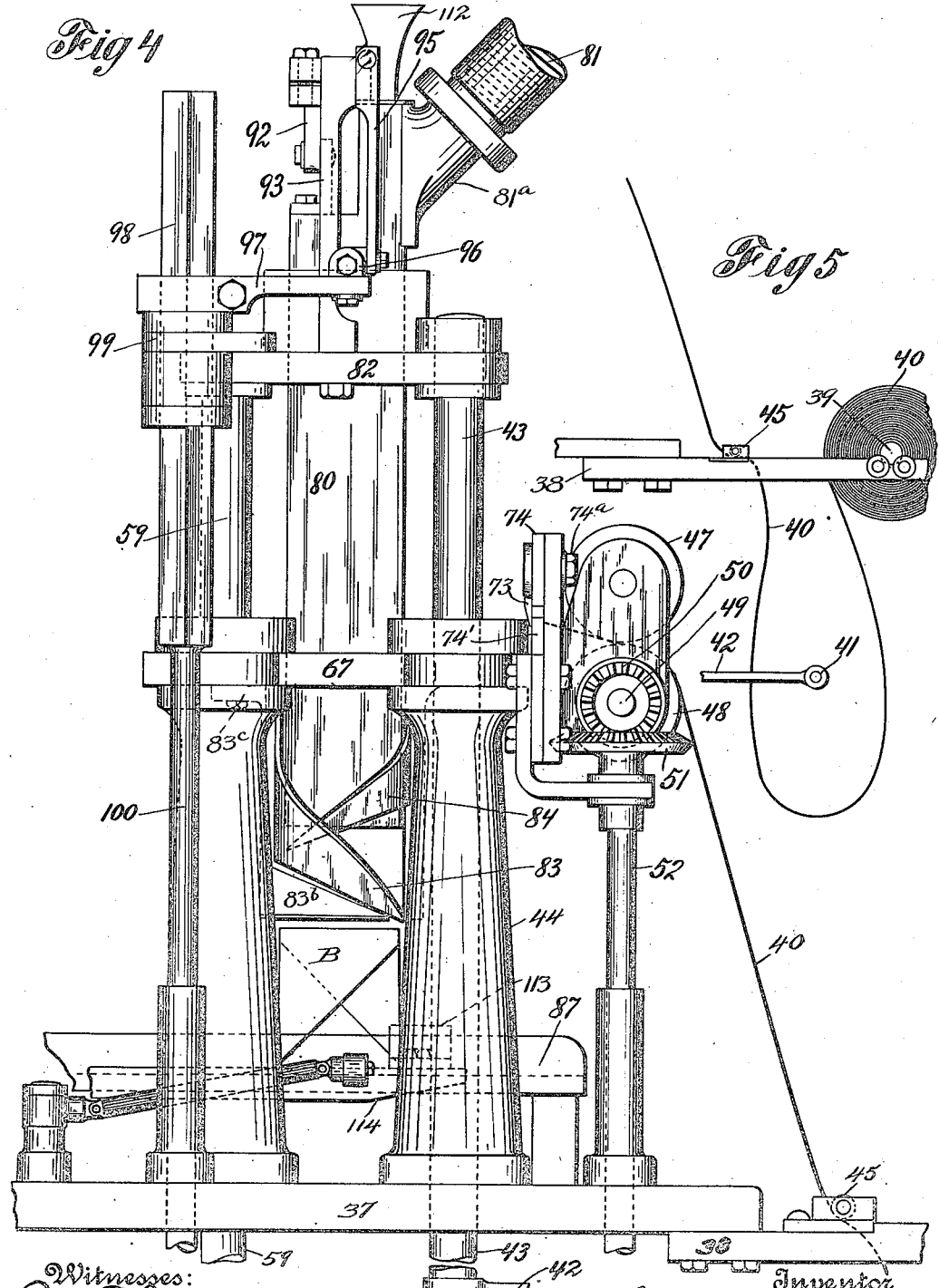

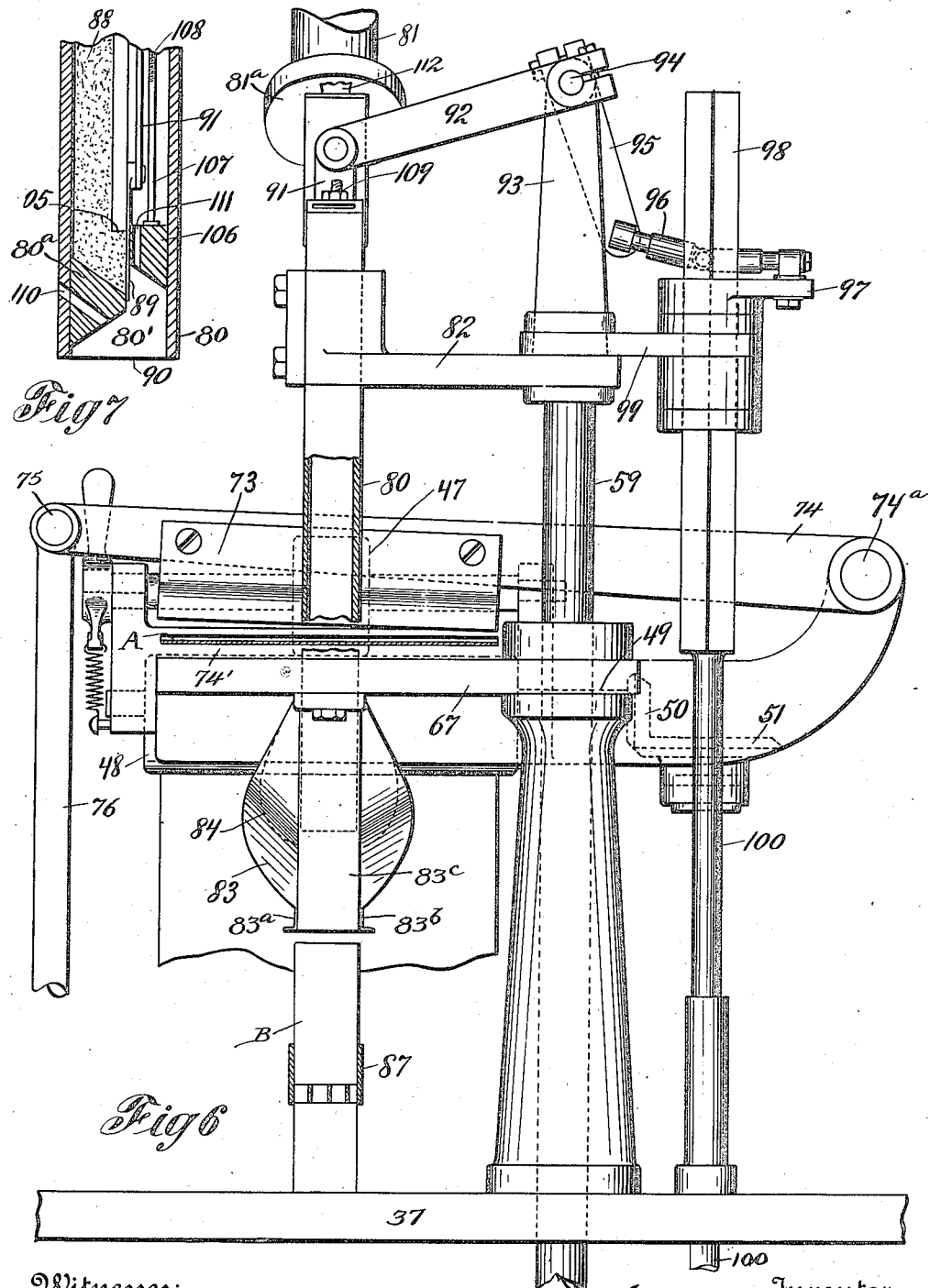

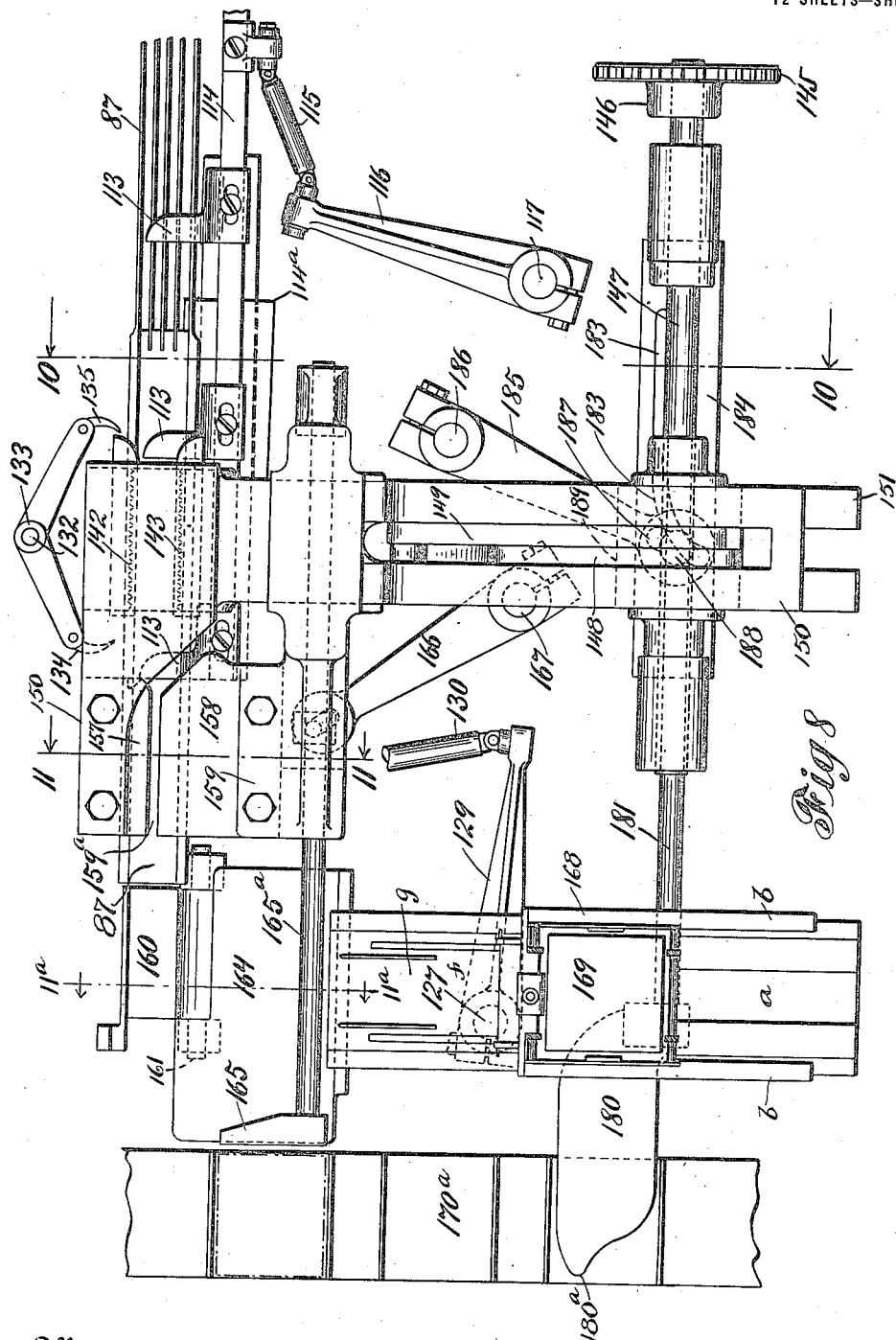

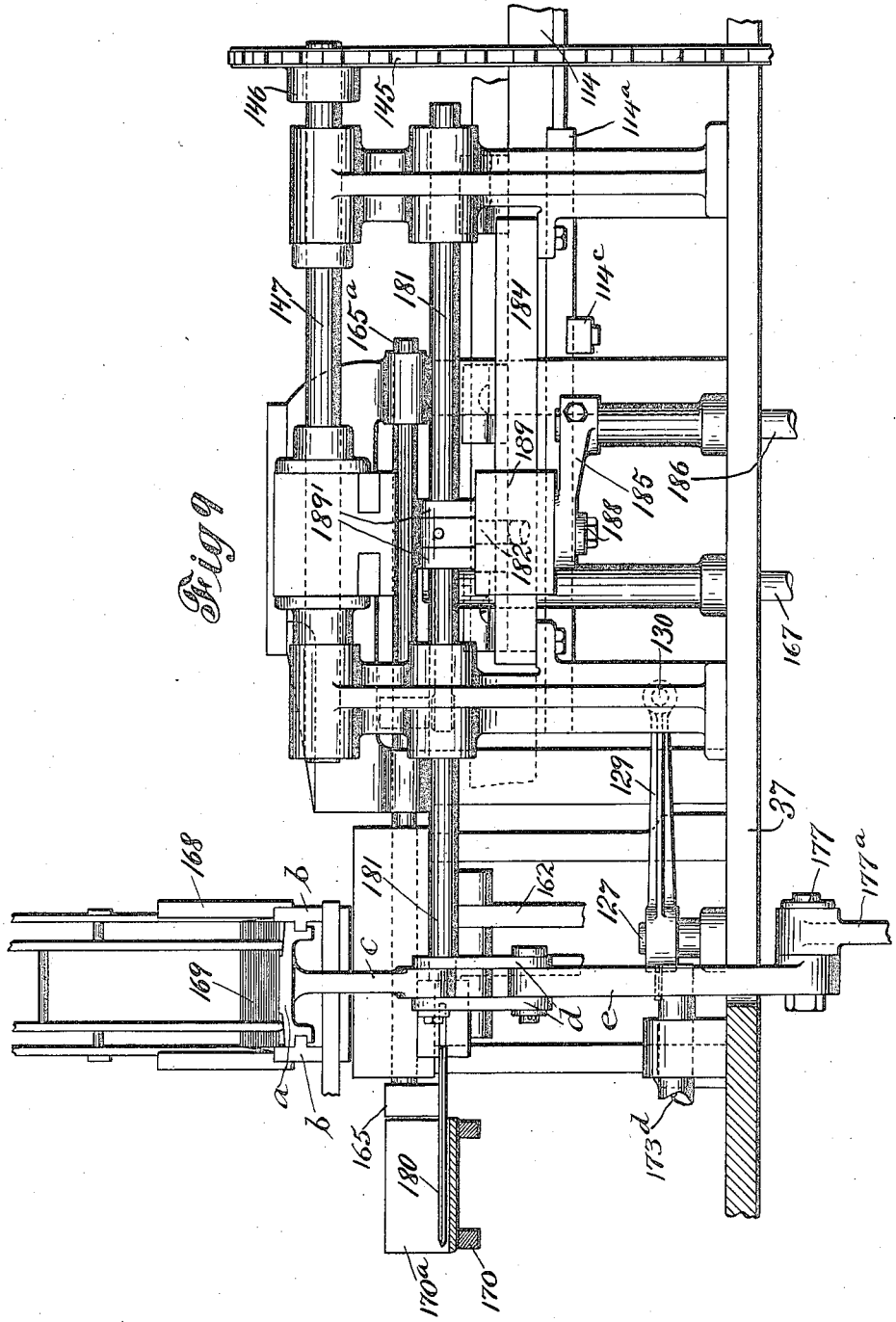

E. D. ANDERSON.
PACKING AND WRAPPING MACHINE.
APPLICATION FILED DEC. 29, 1913.
1,151,233.
Patented Aug. 24, 1915.
12 SHEETS—SHEET 8.
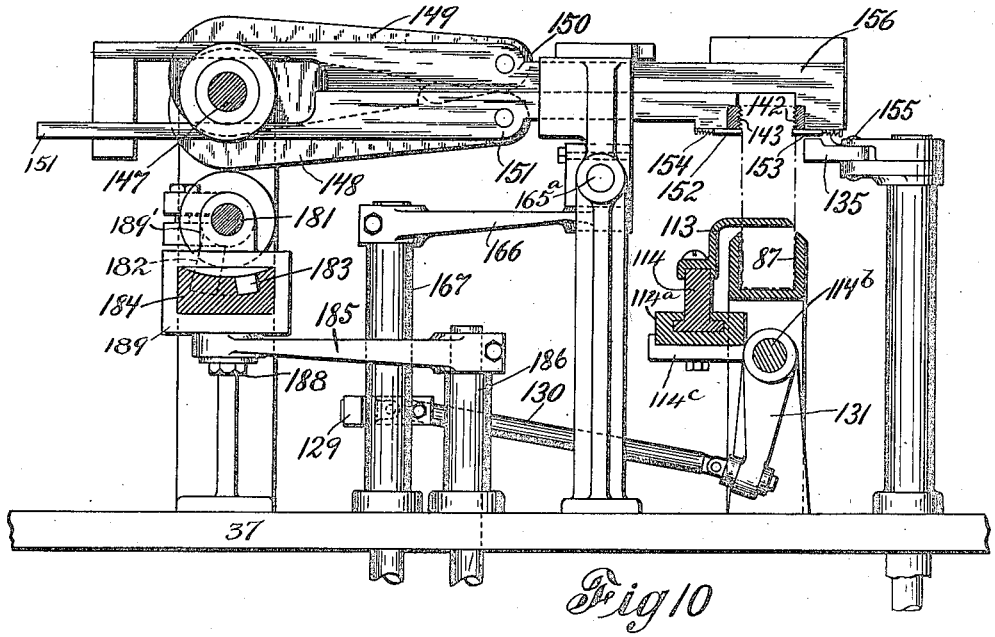
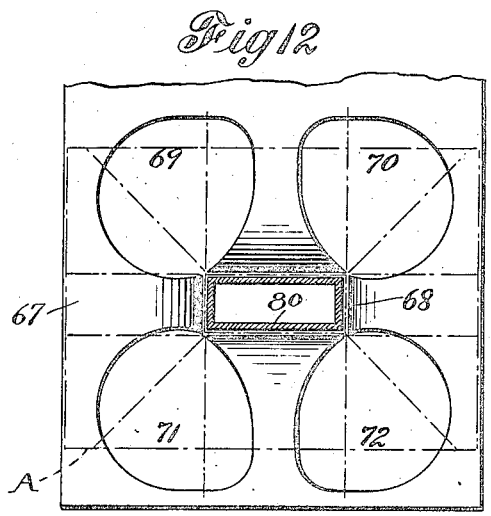
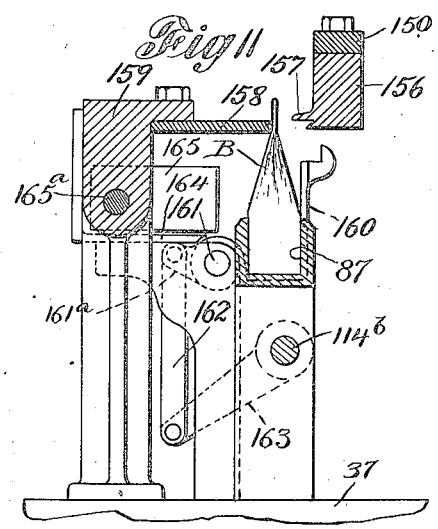
WITNESSES:
INVENTOR
BY
ATTORNEY

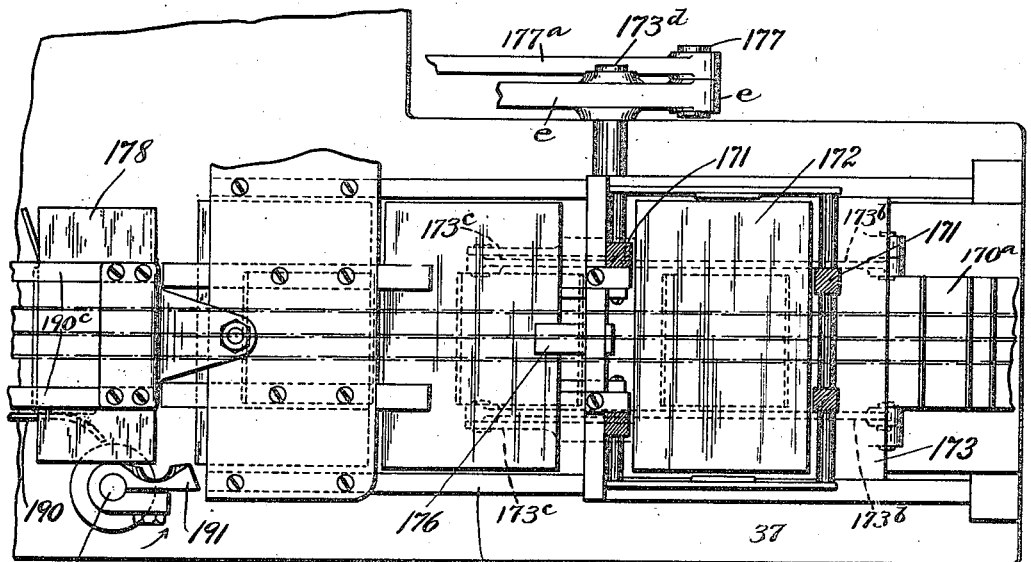
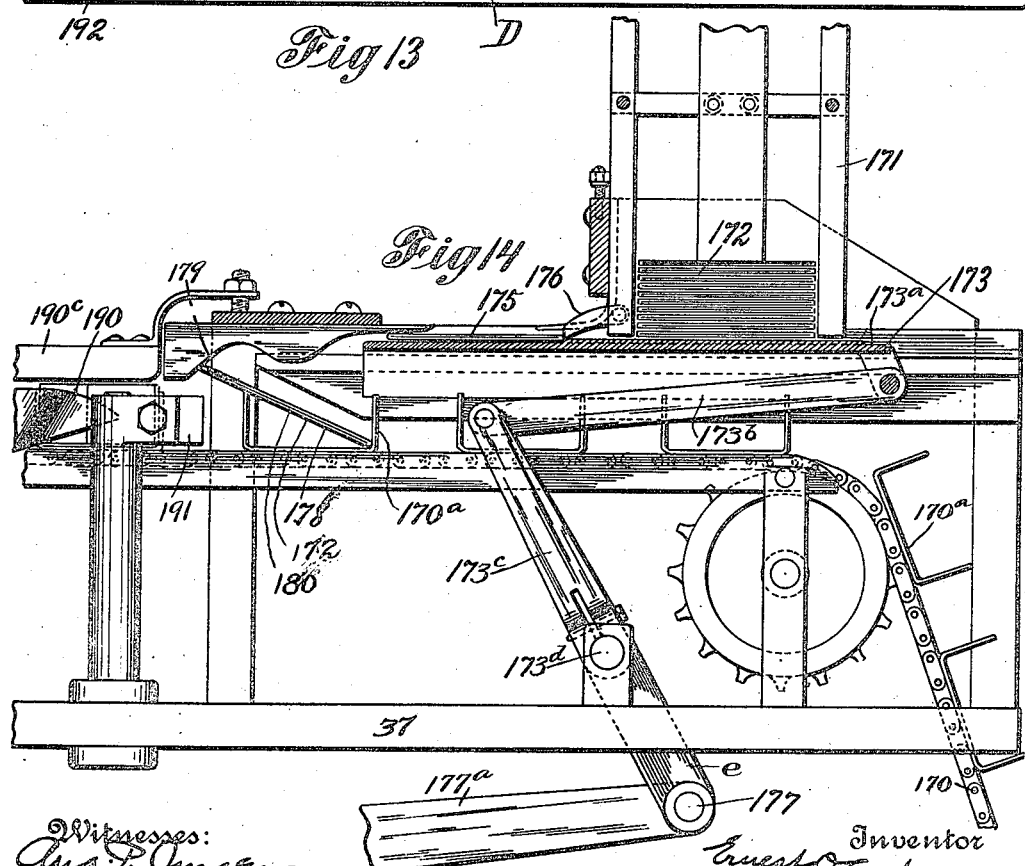

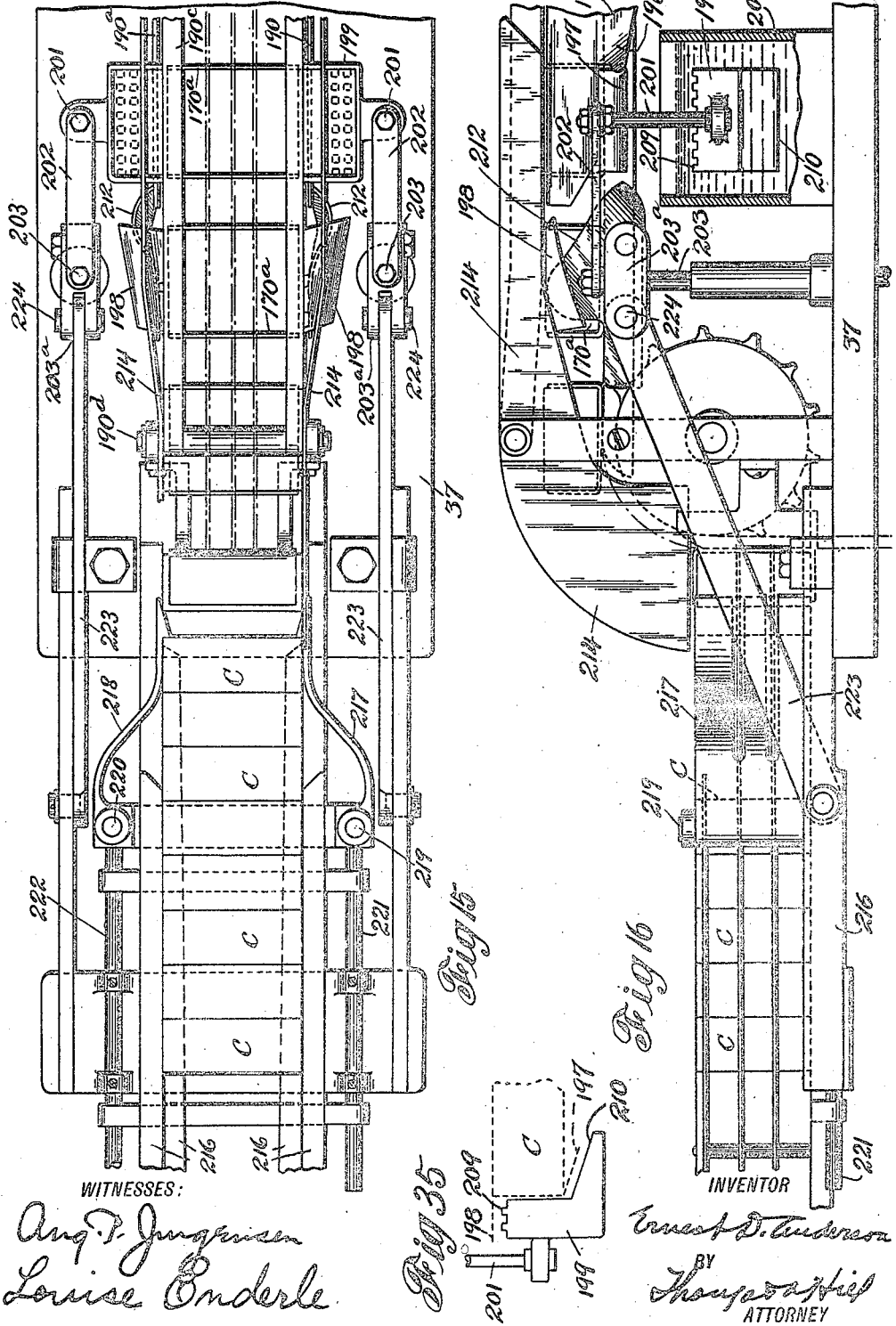

E. D. ANDERSON.
PACKING AND WRAPPING MACHINE.
APPLICATION FILED DEC. 29, 1913.
1,151,233.
Patented Aug. 24, 1915.
12 SHEETS—SHEET 11.
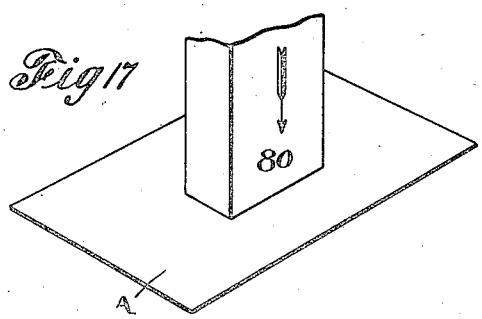
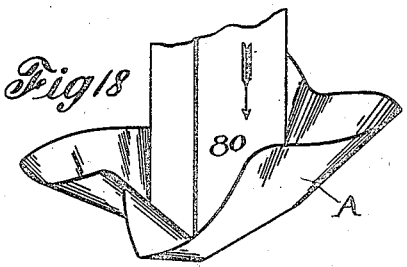
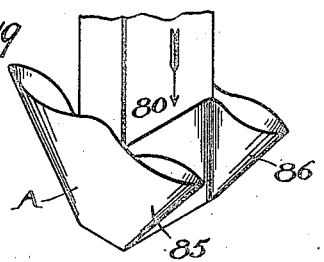
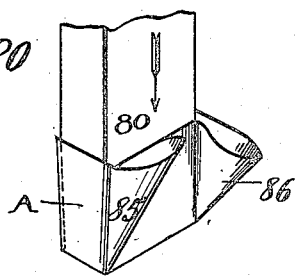
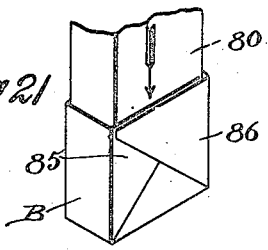
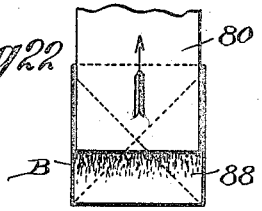
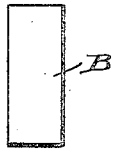
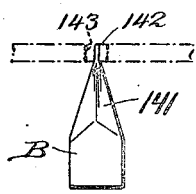
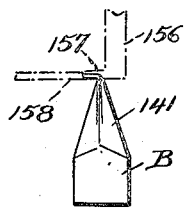
WITNESSES:
Aug. T. Junghusen
Louise Onderle
INVENTOR
Ernest D. Anderson
BY
Thoupa Fifield
ATTORNEY E. D. ANDERSON.
PACKING AND WRAPPING MACHINE.
APPLICATION FILED DEC. 29, 1913.
1,151,233.
Patented Aug. 24, 1915.
12 SHEETS—SHEET 12.
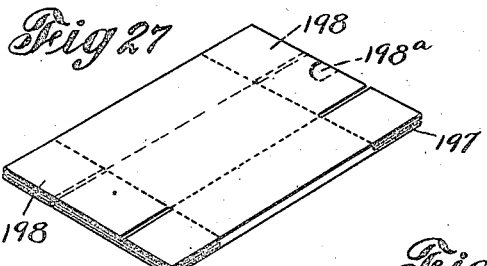
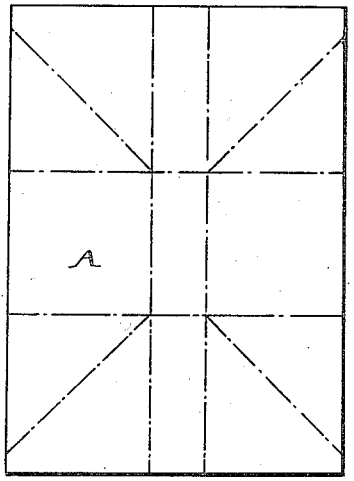
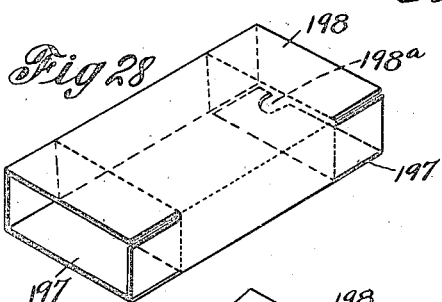
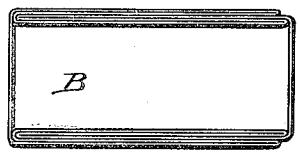
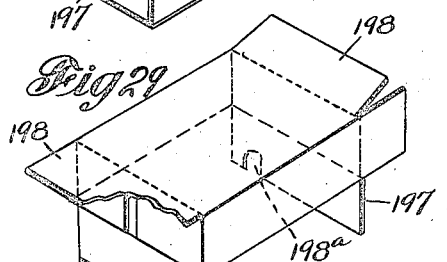
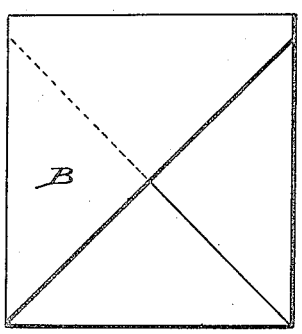
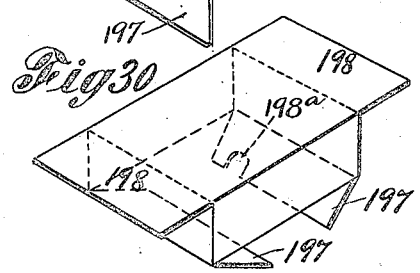
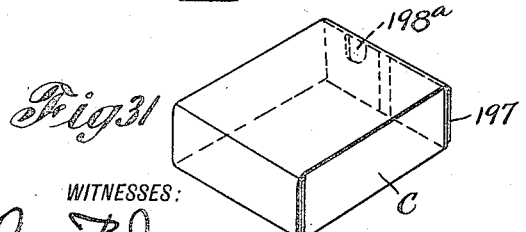
WITNESSES:
Aug. P. Jurgensen
Louise Enderle.
INVENTOR
Ernest D. Anderson
BY
Thompson Littlefield.
ATTORNEY

UNITED STATES PATENT OFFICE.

ERNEST D. ANDERSON, OF NEW YORK, N. Y.

PACKING AND WRAPPING MACHINE.

1,151,233.    Specification of Letters Patent.    Patented Aug. 24, 1915.

Application filed December 29, 1913. Serial No. 809,254.

*To all whom it may concern:*

Be it known that I, ERNEST D. ANDERSON, a citizen of the United States, residing at New York city, in the county of New York and State of New York, have invented certain new and useful Improvements in Packing and Wrapping Machines, of which the following is a specification, reference being had therein to the accompanying drawing.

My invention relates to improvements in forming, packing and boxing machines, and has particular reference to a machine adapted for forming sheets of material into receptacles, into which receptacles powder or granular material is automatically fed, whereupon the formation of the package or receptacle is completed, and the same is sealed, said machine being adapted also to insert such sealed receptacle within an outer container or box, which is also, thereafter, properly closed, sealed and delivered.

My invention further comprises novel details of improvement and combinations of parts that will be more fully hereinafter set forth and then pointed out in the claims.

Reference is to be had to the accompanying drawings forming part hereof, wherein, Figure 1 is a partly broken front elevation of a machine embodying an application of my invention; Fig. 2 is a plan view of the machine; Fig. 3 is a partly sectional plan view beneath the table 37 of the machine; Fig. 4 is an enlarged detail of a portion of the machine, looking from the righthand side of Fig. 2, illustrating the receptacle forming and filling devices; Fig. 5 is an enlarged detail of paper feeding mechanism, Fig. 6 is a partly sectional detail view, looking from the lefthand side of Fig. 4; Fig. 7 is an enlarged detail, partly in cross section, of the lower portion of the plunger mechanism hereinafter referred to; Fig. 8 is an enlarged detail plan view illustrating devices for sealing the filled receptacles, for opening containers or cartons, and for feeding said receptacles and pamphlets therewith into said containers or cartons; Fig. 9 is a side view looking upwardly from the bottom of Fig. 8; Fig. 10 is a cross section substantially on the line 10, 10, in Fig. 8; Fig. 11 is a detail cross section substantially on the line 11, 11, in Fig. 8; Fig. 11ᵃ is a section on the line 11ᵃ, 11ᵃ, in Fig. 8, illustrating the position of parts with the filled and sealed receptacle upon plate or platform 164; Fig. 12 is an enlarged detail of part of the mechanism used in forming and filling the receptacles; Fig. 13 is an enlarged detail plan view, partly in section, illustrating means for feeding closed containers or cartons into position to be opened for receiving sealed receptacles and pamphlets; Fig. 14 is a side view of Fig. 13, partly in section; Fig. 15 is an enlarged detail plan view of parts to the left of those shown in Fig. 13 (intermediate parts being omitted), showing carton pasting, closing and discharging mechanism; Fig. 16 is a partly sectional side view of Fig. 15; Figs. 17 to 20 inclusive illustrate four stages in the formation of the receptacle or package to be made and filled; Fig. 21 illustrates the position of the plunger in the receptacle or package after the latter has been formed; Fig. 22 is a detail view illustrating the position of said plunger during its withdrawal from the receptacle or package, illustrating also the delivery of the goods from the plunger into the receptacle or package; Fig. 23 is an end view of the complete receptacle or package; Fig. 24 is an end view illustrating the receptacle or package after its mouth has been closed; Fig. 25 is a view substantially similar to Fig. 24, but illustrating a step in the sealing of the package; Fig. 26 illustrates the sealed receptacle or package within an outer container or carton; Figs. 27 to 31 inclusive illustrate the container or carton and different stages of the same during its passage through the machine; Fig. 32 is a plan view of the sheet of material from which the receptacle or package is made, illustrating the creases formed in the sheet after the receptacle is made; Fig. 33 is a plan view looking into the open mouth of the receptacle before the same is sealed; Fig. 34 is a side view of the receptacle, and Fig. 35 is a detail of the paster 199.

Similar numerals of reference indicate corresponding parts in the several views.

The main frame of the machine illustrated in the accompanying drawings is shown provided with a base 35 having standards 36 and a table 37 thereon. The frame is shown provided with a bracket or extension 38 (Figs. 2, 4 and 5) carrying shaft 39 upon which a roll of paper or other suitable material, such as 40, is adapted to be mounted. At 41 is a roller adapted to provide slack in the web or strip passing from roll 40, which roller 41 is shown carried by arms 42 that are secured to plunger or rod 43, suitably guided in standard 44 on the main frame (Figs. 2, 4 and 5). At 45 is shown a friction rod carried by bracket 38 above roller 41, from which rod the web or strip 40 passes to plate or platform 67 (Fig. 6) between cutters adapted to cut pieces of material for the receptacles or packages to be formed. Plunger or rod 43 is shown, in Fig. 3, as connected to an arm 60 extending from sleeve 61 journaled upon shaft 79, said sleeve being provided with an arm 62 to which arm is pivotally connected a rod 63 that is secured to an eccentric strap 65 within which rotates the eccentric 66 that is secured upon shaft 58. As shaft 58 rotates, the plunger rod 43 will be reciprocated by the means described, and the roller 41, carried by said plunger, acting upon the web or strip between the paper roll 40 and friction rod 45, will periodically provide slack in the web to be freely taken up by the feeding rollers 47, 48, instead of pulling directly against the roll of paper (Fig. 5). Rollers 47, 48 are shown located between rod 45 and plate 67, for feeding the web or strip step by step. The roller 48 is shown mounted upon shaft 49 that is journaled in suitable supports and provided with the gear 50, in mesh with gear 51 upon shaft 52 (Figs. 2, 4 and 6). Said shaft 52 is shown provided with a pinion 53 in mesh with the gear 54 upon shaft 55 (Fig. 3). To provide a step by step feeding or intermittent movement for the rollers 47, 48, I have shown the parts 56, 57 substantially similar to a Geneva movement, the part 56 being secured upon shaft 55 and part 57 being secured upon the shaft 58. As shaft 58 rotates, the web of strip 40 will be fed step by step or intermittently between the cutters. The plate or platform 67 (Figs. 4, 6 and 12) is sufficiently large to enable the blank A for a receptacle or package to be formed, to rest thereon when cut off from the web by the knife or cutter 73, which is shown carried by an arm 74 pivotally supported at 74ᵃ upon a bracket, said cutter coacting with an edge of a stationary cutter 74ᵇ (Figs. 4 and 6) to sever the web or strip after the proper portion thereof has been projected over plate 67 for a blank. Arm 74 is shown pivotally connected at 75 to a link or rod 76 adapted to be reciprocated by member 77 (Fig. 3) coacting with cam 78, which cam is secured upon the driving shaft 79. The knife 73 and the web feeding devices are so timed that a blank A will be cut from the web or strip 40 for each receptacle or package to be formed and filled.

The plate or platform 67 (Fig. 12) is shown provided with an opening 68 at the central portion, in rectangular form, and said plate is shown provided with four cutaway portions or openings at opposite corners, as indicated at 69 to 72 inclusive, all of which communicate with the central opening 68. In register with opening 68, and normally above the same, is a hollow plunger 80 that is adapted to push the blank A through opening 68 of plate 67. When the plunger is depressed and presses upon said blank, the central part of the blank is pushed through the opening 68, and the four corners of the blank are drawn in, first assuming the position substantially as shown in Fig. 18, the blank next assuming different positions, substantially as shown in Figs. 19 and 20, as plunger 80 descends, the corners of the blank being drawn through the openings 69 to 72 inclusive, as the forming of the receptacle proceeds. As the partially formed blank passes downwardly through plate or platform 67 the supplementary members 83 and 84 (Figs. 4 and 6) that depend from plate 67 and surround the plunger, cause the flaps 85 and 86 (Fig. 20), on the sides of the partially formed receptacle or package, to be pressed flat against the corresponding wall of the partially formed package, to fold said parts 85, 86 in flat form as shown in Fig. 21. The plunger continues downwardly and pushes the thusly formed receptacle with it until said receptacle is deposited upon guideway 87 beneath the plunger (Fig. 6). Below parts 83 and 84 is a stripper comprising spaced resilient fingers 83ᵃ, 83ᵇ, carried by a bar 83ᶜ depending from plate 67. When the plunger 80 pushes a receptacle B between and below the fingers 83ᵃ, 83ᵇ they contract over the receptacle, now on guideway 87, thereby insuring the stripping of the receptacle B from the plunger. At 59 is a plunger or rod parallel to and spaced from the plunger or rod 43, and suitably guided to reciprocate therewith. The plunger or rod 59 is shown connected to the arm 60 (Fig. 3) whereby, when said arm rocks, said plungers or rods 43 and 59 will reciprocate together. Plunger 80 is shown connected to a yoke or bar 82 that is connected with plungers 43 and 59 (Figs. 1, 4 and 6), the plunger 80 being so timed as to be above plate 67 when the web or strip 40 is fed upon the latter, said plunger acting to push the cut off blank A through plate 67 after knife 73 has severed said blank from said web or strip. Plunger 80 is provided with means for charging or filling the desired goods or material into the receptacles B, while the latter are being formed, or while they are deposited upon guideway 87.

The material 88 may be fed into plunger 80 as required, by means of a suitable flexible tube 81, connected with plunger 80 by a suitable coupling at 81ᵃ, said tube being connected with a hopper or the like (not shown) containing the material 88, whereby said material may be conducted to the plunger in all its positions of elevation. To discharge the goods from the plunger 80 in the required charges, said plunger is shown provided with an inner abutment 80ª and an opposing stop 106, a shutter or door 89 within the plunger being adapted to coact with said abutment to normally retain the powder, grain or other material to be packed, indicated at 88, (Fig. 7) within the plunger. The arrangement is such that while plunger 80 is forming the receptacle B, the latter acts as a bottom for the plunger, and during the downward stroke of the plunger the shutter 89 is moved away from abutment 80ª, causing a charge of said material to be deposited in chamber 80'. Shutter 89 is shown pivotally connected with a link or rod 91 that passes within plunger 80, which link, at its upper end, is pivotally connected to the arm 92 that is secured to shaft 94 journaled in bracket 93, which shaft has an arm 95, connected by the universal shaft 96 with an arm 97. The arm 97 is mounted to slide upon a squared or angular portion 98 of shaft or rod 100. Arm 97 is shown connected by the bracket 99 with plunger or rod 59, (Figs. 1, 2 and 6).

From the foregoing it will be understood that when plungers 59 and 80 reciprocate, the parts 91, 92, 94, 95, 96, 97 and 99 will reciprocate therewith, (arm 97 sliding on shaft part 98) and that when arm 97 is given a rotary motion the rod 91 and shutter 89 will be operated, independently of the reciprocating motions of the plungers, for opening and closing shutter 89. For rocking the shaft 100 I have shown the same secured to an arm 101 (Fig. 3) that is pivotally connected with link or rod 102, which link or rod is provided with a projection 103 adapted to coact with a suitable groove in cam 104 secured upon shaft 79. When shaft 79 rotates, the cam 104 will rock the shaft 100 (for rocking arm 97) to cause shutter 89 to be reciprocated, so that each time that shutter 89 uncovers the opening 105, a charge of material 88 is allowed to exhaust into chamber 80'. The amount of such material to be deposited from a charge may be regulated by the adjustable stop 106 (Fig. 7). Said stop is shown connected to rod 107, shown screw-threaded at 108 and provided with an adjusting nut or other suitable means, as indicated at 109 (Fig. 6), whereby the stop 106 may be adjusted with respect to opening 105 according to the amount of material 88 intended to be discharged into each package. At 110 and 111 are indicated air vents through the plunger which serve to enable the air to escape when material 88 passes into chamber 80'; the vent 111 discharging past the link 91 (Fig. 6). At 112 is a vent connecting with plunger 80 to allow the material 88 to readily flow out of plunger 80 and also permit ready charging of the plunger. As the plunger rises from the bottom of the package the material 88 will be deposited in the receptacle or package B substantially as indicated diagrammatically in Fig. 22.

The guideway 87 is preferably somewhat open at its bottom beneath plunger 80, as indicated in Figs. 6 and 8, whereby as the receptacles or packages are deposited upon the guideway, the grain or dust that escapes from the packages or the plunger 80 will readily drop through the guideway, instead of remaining therein to retard the progress of the filled receptacle along the guideway. Means are provided for periodically moving the charged or filled receptacles along guideway 87. To this end I provide fingers or projections indicated at 113, (Figs. 2, 8 and 10) that are shown carried upon a bar 114 guided to slide in a block or support 114ª (Figs. 8, 9, 10 and 11), that is supported upon one or more arms 114ᶜ secured upon a rock shaft 114ᵇ, journaled in suitable bearings on the main frame. To reciprocate the bar 114 the same is shown connected by the universal rod 115 (Fig. 8) to the arm 116 secured on shaft 117 that is journaled in suitable bearings on the main frame or table. As shown in Fig. 3, an arm 118 is connected to shaft 117, which arm is pivotally connected with rod 120 having a projection coacting with a suitable cam 120ª on shaft 79, whereby shaft 117 may be rocked to reciprocate bar 114 in the required order.

The fingers 113 are adapted to swing upwardly to clear the spaced receptacles in guideway 87 when bar 114 has been moved to the left in Fig. 8, and to swing down behind said receptacle when said bar has been moved to the right in Fig. 8, in position to propel said receptacles. To this end shaft 114ᵇ (Fig. 10) is shown provided with an arm 131 connected by a universal rod 130 with an arm 129 that is secured upon shaft 127 (Figs. 8 and 9) journaled in suitable bearings on the main frame or plate, which shaft is shown provided with an arm 126 (Fig. 3) pivotally connected with rod 125 having a projection coacting with cam 125ª secured on shaft 79 (Fig. 3), whereby as shaft 127 is rocked the bar 114 and fingers 113 will also be rocked. The arrangement is such and the parts are so timed that the finger 113 at the righthand side of Fig. 8 will move receptacles or packages B along guideway 87, as deposited therein by plunger 80, to a position on said guideway where the ends of the receptacles are crimped or folded inwardly by means of the pincher fingers 134, 135, at which position the mouths of the receptacles are sealed; the middle one of the three fingers 113 will move the sealed receptacles from the last named position to a position between devices for folding the sealed mouths of the receptacles and the finger 113 at the left in Fig. 8 will move the receptacles from the last named position to a receiver 160 adapted to place the sealed receptacles upon plate 164, whence they will be pushed into cartons as hereinafter explained. After bar 114 has been moved to the left in Fig. 8 the required distance, the arm 131 will rock the block 114 to cause the fingers 113 to be tilted out of the path of receptacles behind them, after which bar 114 is moved to the right to carry said fingers behind receptacles on guideway 87, and then said bar is rocked reversely to cause said fingers to be lowered behind said receptacles, and so on each time the receptacles are to be fed step by step along guideway 87. When each receptacle is moved by the middle finger 113 along the guideway into position adjacent to the fingers 134, 135, the receptacle is temporarily left in such position, and thereupon said fingers are caused to engage the ends of the receptacle to pinch or press them inwardly. To this end the fingers 134, 135 are respectively carried by concentric shafts 132, 133 that are suitably mounted on the main frame or plate (Fig. 8), and, as shown in Fig. 3, said shafts are respectively connected with arms 136, 137. Arm 136 is shown pivotally connected with a rod 138 and arm 137 is shown pivotally connected by a rod 139 with said rod 138, as indicated at 140. Rod 138 is operated by a cam 138$^a$ on shaft 58, whereby as rod 138 is reciprocated the arms 136, 137 will be rocked toward and from each other, thereby causing the pincher fingers 134, 135 to be moved toward and from the adjacent receptacle, said pincher fingers being operated periodically as the successive receptacles are brought to rest adjacent thereto. The receptacles are fed in a path at one side of the normal position of the pincher fingers. While a receptacle is in the last named position the mouth of the receptacle is closed and sealed, by means adapted to squeeze or crimp the top opposing edges or walls of the receptacle. For this purpose I provide jaws 142, 143, located on opposite sides of the path of the receptacle, and in position between the pincher fingers 134, 135 (Figs. 8 and 10). The jaw 142 is shown carried by a reciprocative bar 150 and the jaw 143 is shown carried by the opposing reciprocative bar 151, which bars are suitably guided in bearings in the main frame or plate. By having teeth on the jaws 142, 143 the material at the end of the receptacle is indented or punctured and sealed. Bar 150 is also shown provided with a stripper plate 153 opposing a corresponding plate 152 on bar 151 (Fig. 10).

The plates 152 and 153 are normally projected forwardly by suitable resilient means, such as the spring 154, 155 (Fig. 10), and serve to strip the receptacle from the jaws 142, 143 after the mouth of the receptacle has been closed and the bars 150 and 151 recede. Links 149 and 148, respectively pivotally connected with bars 150 and 151, and coacting with eccentrics secured upon shaft 147, cause the jaws 142, 143 and the plates 153, 154 to reciprocate. Shaft 147 is shown provided with a sprocket wheel 146 (Fig. 9) receiving a chain 145 from a sprocket wheel 144 secured on shaft 58 (Fig. 3). The jaws 142, 143 are normally spread apart (Fig. 10) to permit the mouth parts of the receptacles to pass therebetween, and the arrangement and timing of the parts is such that just as the pincher fingers 134, 135 begin to recede from the receptacle the jaws 142, 143 and the plates 153, 154 approach and crimp the mouth portion of said receptacle, the fingers 134, 135 passing away from said receptacle substantially as the crimping or closing of the receptacle mouth occurs. The position of the mouth of the receptacle between the jaws 142, 143 when the same is crimped or sealed is shown diagrammatically in Fig. 24, the depression at the end of the receptacle being indicated at 141. The paper used may, of course, be suitably waxed on one or both sides, if desired, to aid in sealing the receptacle.

After the mouths of the receptacles have been sealed the receptacles are successively moved by the appropriate finger 113, along guideway 87 to a position in space 159$^a$ between the projecting portion 157 of a flap turning or folding member 156 and the abutment or plate 158 (Figs. 8 and 11). The member 156 is carried by the block 150 and the plate 158 is suitably secured to the fixed member 159 secured on the frame. The mouth of the receptacle is temporarily retained in the space 159$^a$, and the arrangement is such that when the block 150 moves the jaw 142 to crimp or close the mouth of one receptacle, the projection 157 will move to turn the mouth of the receptacle, at the left of the last named receptacle in Fig. 8, over plate 158 in the manner indicated diagrammatically in Fig. 25.

After the mouth portion of the last named receptacle has been turned over, as stated, said receptacle is fed, by the finger 113 at the lefthand side of Fig. 8, into a pivoted receiver or bracket 160 (Figs. 8 and 11), that is adjacent to and spaced from a plate or platform 164 (Figs. 2, 8 and 11). Said receiver 160 is to be rocked intermittently, and for this purpose I have shown the shaft 114$^b$ provided with an arm 163 pivotally connected by a link 162 with an arm 161$^a$, that is secured to the spindle or shaft 161 to which the receiver or bracket 160 is secured, shaft 161 being journaled in a suitable support, (Fig. 11). The arrangement is such that while shaft 114ᵇ is rocked to cause the fingers 113 to pass clear of the receptacles on guideway 87, the receiver 160 will be rocked to deposit a receptacle B upon the plate or platform 164, (Fig. 11ᵃ).

When the receptacles or packages B have been filled, sealed and deposited upon platform 164, as stated, they may be removed or discharged from the machine in any suitable manner, without being placed in a carton or container, but in the arrangements illustrated in the accompanying drawings I have provided means for opening cartons, placing the opened cartons in front of the receptacles B upon plate 164, pushing said receptacles into said cartons successively, closing and sealing the cartons, and delivering the same from the machine.

After a receptacle is deposited by the action of receiver 160 upon plate 164, said receptacle is pushed by a plunger 165 from said plate into an open carton, which at such moment is retained with its open end opposed to said plunger. The pusher or plunger 165 is shown carried by a rod 165ᵃ (Figs. 2, 8, 9 and 10) that is guided to reciprocate in suitable bearings on the main frame or plate. Said rod is shown pivotally connected with an arm 166 secured upon shaft 167 carried in suitable bearings upon the main frame or plate. Shaft 167 is shown provided with an arm 124 pivotally connected by a link 122 with arm 119 secured to shaft 117, (Fig. 3) whereby as said shaft is rocked the pusher 165 will be reciprocated at the proper time.

In order to enable pamphlets, circulars, or the like to be delivered with the cartons, I have illustrated means for inserting pamphlets or the like into the cartons with the receptacles B. To this end I have shown the machine provided with a magazine or the like indicated at 168, located in a position adjacent to and at an elevation above the plate or platform 164 (Figs. 1, 2, 8 and 9). The pamphlets 169 are shown stacked in magazine 168. As illustrated, the lowermost pamphlets of the stack are adapted to be discharged successively upon plate 164, to which end a discharger $a$ (Figs. 2, 8 and 9) is guided at $b$, which discharger has a depending arm $c$ pivotally connected by links $d$ with a lever $e$ secured on shaft 173ᵈ, which is rocked as hereinafter explained. As said shaft is rocked, the pamphlets 169 will be discharged successively upon a platform $f$ (Figs. 2 and 8), whence such pamphlets are discharged and slide down inclined ledge $g$ upon plate or platform 164, being pushed by the forward portion of the discharger $a$ as it ejects a pamphlet from beneath the stack. At the time that the pamphlet drops upon plate or platform 164 the pusher 165 is in the position shown in Fig. 2. The arrangement and timing of the parts illustrated are such that after a pamphlet 169 has been deposited upon plate 164, the receiver 160 is operated to turn or lay a filled receptacle B upon said pamphlet now on said plate 164, as illustrated in Fig. 11ᵃ.

The closed or collapsed cartons or containers 172 are shown stacked in a suitable magazine at 171, secured upon the main plate 37, from which magazine the lowermost cartons are successively delivered. Beneath magazine 171 is a reciprocative plate or platform 173, suitably guided upon the frame and provided with one or more ribs or the like 173ᵃ (Fig. 14) upon which the cartons 172 normally rest. The plate 173 is shown pivotally connected by links 173ᵇ with rock arms 173ᶜ carried by shaft 173ᵈ journaled upon plate 37 (Figs. 1 and 14). Link 177ᵃ is secured to an eccentric strap 177′ operated by an eccentric secured upon shaft 79, whereby plates 173 and $a$ are reciprocated and timed. At 176 is a dog pivoted in front of magazine 171. When plate 173 is moved to the right in Fig. 14 the required distance the ribs 173ᵃ pass behind the lowermost carton 172, the cartons then resting upon the lefthand portion of plate 173 in front of said ribs. Upon the forward stroke of plate 173 the lowermost carton is pushed from under the stack by the ribs 173ᵃ, substantially to the position shown at 175 in Fig. 14, whereupon dog 176 drops behind such carton to keep the latter from moving to the right when plate 172 next moves back. When said plate moves sufficiently far to the right from the position shown in Fig. 14, to release said carton at 175, said carton drops off of the retracted plate into one of the pockets or receivers 170ᵃ of the endless conveyer 170, that is shown comprising chains carried around suitably supported sprockets. Said conveyer is given a suitable step by step or intermittent motion as hereinafter described. When the carton has been dropped from plate 173 into the pocket 170ᵃ, the conveyer moves forward or to the left (Fig. 14), and brings said carton against the stop 179, causing the carton to be seated in the pocket, and the conveyer comes to rest with the carton opposite to an opener or knife 180 that is adapted to enter one end of the carton, said opener being adapted to rotate to open the carton. The opposite end of the carton opposes a plate or abutment D (Fig. 13) resisting the entrance of the opener. As illustrated in Fig. 14 the carton is suspended or bridged between its edges, by means of spaced supports, one of such supports being shown as a corner of receiver 170ᵃ and the other support being an edge of the opposite wall of the receiver, the bottom of the receiver serving as a fixed wall.

The carton is thus unsupported between opposite edges. The normal position of the opener is such that just as the carton comes to rest the point of the opener or knife is brought into contact with the adjacent top flap 198 of the carton, (Fig. 27) having passed through the notch 198ª of the flap 197, partially separating said flaps. The opener 180 is then moved forward into the carton and is rotated in such a manner that at the end of its forward stroke the opener opens the carton and squares it into the pocket or receiver 170ª, dragging the carton from one of its supports, whereupon the opener retreats from the carton. For operating the opener 180, in the manner stated, I have shown the same carried upon a shaft or rod 181 (Figs. 8 and 9) that is provided with a pin 182 entering a slot 183 provided in the concave face of the fixed block 184 (Figs. 8 and 10). A block 189 has jaws 189' adapted to receive the head portion of pin 182 between them (Fig. 9), which jaws are mounted freely upon shaft or rod 181, which block 189 is provided with a pin 188 coacting with an arm 185 (Fig. 8) that has a suitable slot 187 receiving said pin 188. Arm 185 is secured upon shaft 186 suitably journaled upon the main frame or plate, to which shaft is secured arm 123 (Fig. 3) that is pivotally connected by a link 121 with arm 119, whereby as shaft 117 is rocked the shaft 186 will be correspondingly rocked to cause shaft 181 to reciprocate.

When shaft 181 has been moved to the limit of its stroke to the right in Fig. 8, the opener 180 will be retracted from over conveyer 170, but with the end portion 180ª of said opener in the path of travel of the corresponding end flaps of cartons on said conveyer, so that as a carton coincides with said opener the end 180ª of the latter will enter between the projecting flaps of the carton, as before stated, and thereupon, when the conveyer comes to rest, the arm 185 propels shaft 181 and the opener to the left in Fig. 8, causing the opener to enter the carton, and when pin 182 engages the curved portion of slot 183, said shaft and opener will be rotated, causing the opener to open and square the carton and seat it in the corresponding pocket 170ª, (Fig. 9).

Before the conveyer is moved the next step forward the arm 185 returns, causing the opener to be withdrawn from the carton ready to enter and open a succeeding carton, and so on. Upon the next step or movement of the conveyer 170 the said opened carton is brought into position substantially as shown in Fig. 13, indicated at 178, and during such movement the abutment or guard 190 engages the forward lefthand edge flap that is at the end of the carton farthest from opener 180 and closes the same, and thereupon the arm 191 is rotated in the direction of the arrow in Fig. 13 to close the corresponding righthand edge flap of the carton, springing said flap under the guard or shoe 190, which holds said flap from returning to its original position. Shaft 192 is provided with an arm 193 (Fig. 3) pivotally connected by link 194 to the rod 195 operatively connected with cam 195ª on shaft 58, for rocking the shaft 192 at the proper time. During the next step forward of the conveyer said carton is moved from the position of Fig. 13 to the left, whereupon the lower flap is pressed downwardly by the guard 190 (Figs. 1, 2, 13 and 14), and the conveyer is brought to rest with said carton opposite the plate or platform 164 and plunger or pusher 165. Thereupon said plunger advances and pushes a pamphlet and receptacle B thereon into the open end of the carton. The plunger 165 is next withdrawn, and said carton is moved along the guard 190 which retains the adjacent previously folded flaps closed, and along a guard 190ª (Fig. 2) which guards cause the lower flaps 197 to be bent under the carton in the manner diagrammatically shown in Fig. 29, and the conveyer is stopped at an idle point, enabling the work then to be inspected and both flaps 197 will be in the position shown in Fig. 29. The conveyer is then moved another step and the guard part 190ᵇ closes the adjacent forward end flap and the conveyer comes to rest. A flap closer or arm 191' (Fig. 2) now operates to close the opposite edge flap, in manner similar to the action of arm 191. Arm or closer 191' is carried by a shaft 191ª to which is secured the arm 191ᵇ pivotally connected to rod 195, whereby arms 191, 192 and 191ª are operated together. During the next step of the conveyer the flaps 197 are turned under the carton, substantially as in Figs. 30 and 35, by the curved tip portions 196 of guides 190 (Fig. 16), whereupon the conveyer comes to rest, with said carton opposed to the glue or paste pots 200 containing pasters 199 (see Figs. 1, 2, 15 and 16), the paster being shown more particularly in detail in Figs. 16 and 35. The pasters are shown connected with spindles or rods 201, which in turn are connected by the bars 202 with plungers 203 (Figs. 1 and 16) guided in bearings in the main frame or plate. The plungers 203 are connected by the links 204 with levers 205 which are shown pivoted upon shaft 79, the levers 205 (Fig. 1) having slots 206 receiving pins 207 on arms 207ª projecting from shaft 208, driven continuously by gear 229 fixed to shaft 208. Gear 229 is driven by gear 228 fixed to shaft 79. By this means the pasters are periodically reciprocated and upon the upward stroke the upper parts 209 of the pasters engage the under sides of the upper flaps 198 of the carton (Figs. 30 and 35), and the lower portions 210 of the pasters engage the lower turned under flaps 197 (Fig. 35) to apply paste to said flaps. The next step to the left of conveyer 170 causes flaps 197 to engage the guards 212, to cause said flaps of the carton to be laid against the previously closed-in narrow flaps, and flaps 198 engage guards 214 (Fig. 15) closing said flaps over the flaps 197, whereby the charged carton C is sealed as indicated in Fig. 31. The next step forward of the conveyer causes the sealed carton to continue to travel between the guards 214 where they are squeezed sufficiently to insure sealing of the flaps, and thereafter the cartons are discharged from the conveyer upon a discharge plate or guideway 216 (Figs. 15 and 16). At this point the cartons are engaged by the resilient arms 217, 218, pivoted respectively at 219 and 220 upon the ends of the reciprocative rods 221, 222 guided in suitable bearings, (Figs. 15 and 16). Said rods are pivotally connected by the arms 223 at 224 with heads 203ª carried by the plungers 203, whereby, as said plungers reciprocate, the arms 223 cause the rods 221, 222 to reciprocate periodically, so that as each carton is deposited upon the plate or guideway 216 it is caught between the fingers 217, 218 and drawn to the left in Fig. 15, against the preceding carton, whereby the finished cartons C are delivered successively, said cartons pushing one another along the guideway.

At 190ᶜ are rails overlying the conveyer beneath which the cartons are propelled and prevented from rising. Said rails are shown pivotally supported at 190ᵈ whereby they may be lifted for access to cartons on the conveyer.

Referring to Fig. 1, it will be observed that the main driving shaft 79 is provided with a sprocket wheel 225, which drives the sprocket chain 226 upon sprocket wheel 227, mounted upon shaft 58, thus transmitting necessary power for the cams on said shaft hereinbefore referred to. It will also be observed that the power shaft 79 is also provided with a gear 228 which meshes with a gear 229 upon the shaft 208, which carries the male member 230 of the Geneva movement, which in turn engages the female member 231 of said movement that is upon the shaft 232, which shaft also carries the sprocket wheel 233 engaging and driving the endless conveyer 170 intermittently or periodically step by step, around sprockets 233, 233ª, 233ᵇ and 233ᶜ, Fig. 1. Main shaft 79 may be driven in any suitable manner as through the gear 79ª (Fig. 3) from any suitable source.

The parts are so arranged and timed that the receptacles will be made, charged and sealed successively, that the cartons will be successively fed into the receivers of the conveyer that the opener will open and seat cartons successively in the receivers, that the receptacles and pamphlets will be successively fed into the opened cartons, and that the cartons will be successively closed, sealed and delivered.

Having now described my invention what I claim is:—

1. An apparatus of the class described comprising means for forming receptacles from sheets of material, means for charging material into said receptacles, and means for squeezing together the opposing unfolded walls of the mouth of the receptacle and securing said walls together.

2. An apparatus of the class described comprising means for forming receptacles from sheets of material, means for charging material into such receptacles, means for forcing together the opposing walls of the mouth of the receptacle, and means for turning over said mouth of said receptacle.

3. An apparatus of the class described comprising means for forming a four-sided receptacle having two opposing sides longer than two other sides thereof, means for forcing opposing walls of said receptacle into contact and upsetting the same to secure said walls together.

4. An apparatus of the class described comprising means for forming receptacles, means to charge the receptacles, means to press inwardly opposing walls of the receptacle leaving them unfolded, and means to squeeze other opposing walls of the receptacle toward each other with said inwardly pressed walls between them and to secure them together.

5. An apparatus of the class described comprising means for forming receptacles, means to charge the receptacles, normally spaced opposing jaws, means to place said receptacles with their open mouths between said jaws, and means to cause said jaws to squeeze the unfolded mouths of said receptacles.

6. An apparatus of the class described comprising means for forming receptacles, means to charge the receptacles, normally spaced opposing jaws, means to place said receptacles with their open mouths between said jaws, and means to cause said jaws to squeeze the unfolded mouths of said receptacles and secure them together.

7. An apparatus of the class described comprising means for forming receptacles, means to charge the receptacles, normally spaced opposing jaws, means to place said receptacles with their open mouths between said jaws, means to cause said jaws to close said mouths of said receptacles and secure said mouths together, and means to turn over the closed mouths of said receptacles.

8. An apparatus of the class described comprising means for forming receptacles, means to charge the receptacles, normally spaced fingers, normally spaced opposing jaws adjacent to said fingers, means to place said receptacles with their open mouths in the path of said jaws in position to be engaged by said fingers, means to cause said fingers to press inwardly opposing sides of said receptacles, and means to cause said jaws to close said mouths of said receptacles.

9. An apparatus of the class described comprising means for forming receptacles, means to charge the receptacles, normally spaced fingers, normally spaced opposing jaws adjacent to said fingers, means to place said receptacles with their open mouths in the path of said jaws in position to be engaged by said fingers, means to cause said fingers to press inwardly opposing sides of said receptacles, and means to cause said jaws to close said mouths of said receptacles, said finger operating means causing said fingers to be withdrawn from the receptacles while the jaws are closing the mouths of the receptacles.

10. An apparatus of the class described comprising means for forming receptacles, means to charge the receptacles, normally spaced fingers, normally spaced opposing jaws adjacent to said fingers, means to place said receptacles with their open mouths in the path of said jaws in position to be engaged by said fingers, means to cause said fingers to press inwardly opposing sides of said receptacles, means to cause said jaws to close said mouths of said receptacles, said finger operating means causing said fingers to be withdrawn from the receptacles while the jaws are closing the mouths of the receptacles, and means to turn over the closed mouths of said receptacles.

11. An apparatus of the class described comprising means to charge receptacles, spaced jaws, means to convey open mouthed receptacles step by step between and from said jaws substantially transversely to the mouth of the jaws, and means to cause said jaws to close and secure opposing walls of said receptacles together.

12. An apparatus of the class described comprising means to charge receptacles, spaced jaws, means to convey open mouthed receptacles step by step between and from said jaws substantially transversely to the mouth of the jaws, means to cause said jaws to close and secure opposing walls of said receptacles together, and means to turn over said closed mouths of said receptacles.

13. An apparatus of the class described comprising means to charge receptacles, spaced jaws, pincher fingers adjacent to and normally at one side of the space between said jaws, means to convey open mouthed receptacles step by step between said jaws and adjacent to said fingers, means to cause said fingers to press inwardly opposing sides of the mouths of said receptacles, and means to cause said jaws to force said mouths of said receptacles together.

14. An apparatus of the class described comprising means to charge receptacles, spaced jaws, pincher fingers adjacent to and normally at one side of the space between said jaws, means to convey open mouthed receptacles step by step between said jaws and adjacent to said fingers, means to cause said fingers to press inwardly opposing sides of the mouths of said receptacles, means to cause said jaws to force said mouths of said receptacles together, and means to turn over the closed mouths of said receptacles.

15. An apparatus of the class described comprising means for forming receptacles, means for delivering material into said receptacles, means for closing the mouths of said receptacles, a conveyer having carton receivers, means to open cartons within said receivers, means for inserting said closed receptacles in said cartons, and means for closing the cartons.

16. An apparatus of the class described comprising means for forming receptacles, means for charging material into said receptacles, means for closing said receptacles, means for delivering and opening collapsed cartons, means for inserting said charged and closed receptacles together with other material into said opened cartons, and means for closing said cartons.

17. An apparatus of the class described comprising means for forming receptacles, means for delivering material into said receptacles, means for closing the mouths of said receptacles, means to feed said receptacles step by step, a plate adjacent to said feeding means to receive closed receptacles therefrom, means to temporarily retain cartons adjacent to said plate, means to open cartons within said retaining means, and means to push said receptacles from said plate into said cartons.

18. An apparatus of the class described comprising means for forming receptacles, means for delivering material into said receptacles, means for closing the mouths of said receptacles, means to feed said receptacles step by step, a plate adjacent to said feeding means to receive closed receptacles therefrom, means to temporarily retain cartons adjacent to said plate, means to open cartons within said retaining means, means to push said receptacles from said plate into said cartons, and means to close said cartons.

19. An apparatus of the class described comprising means for forming receptacles, means for delivering material into said receptacles, means for closing the mouths of said receptacles, means to feed said receptacles step by step, a plate adjacent to said feeding means to receive closed receptacles therefrom, means to temporarily retain cartons adjacent to said plate, means to open cartons within said retaining means, means to push said receptacles from said plate into said cartons, means to close said cartons, and means to seal said closed cartons.

20. An apparatus of the class described comprising means for forming receptacles, means for delivering material into said receptacles, means for closing the mouths of said receptacles, means to feed said receptacles step by step, a plate adjacent to said feeding means to receive closed receptacles therefrom, means to temporarily retain the cartons adjacent to said plate, means to open cartons within said retaining means, means to associate other material with said receptacles on said plate, and means to push said receptacles and said other material together from said plate into said cartons.

21. An apparatus of the class described comprising means for forming receptacles, means for delivering material into said receptacles, means for closing the mouths of said receptacles, means to feed said receptacles step by step, a plate adjacent to said feeding means to receive closed receptacles therefrom, means to apply other material with said receptacles upon said plate, means to temporarily retain the cartons adjacent to said plate, means to open cartons within said retaining means, a reciprocative pusher operative above said plate to push said receptacles and material into cartons upon said conveyer.

22. An apparatus of the class described comprising means for forming receptacles, means for delivering material into said receptacles, means for closing the mouths of said receptacles, means to feed said receptacles, a pivoted receiver adapted to receive receptacles from said feeding means, a support adjacent to said receiver, and means to operate said receiver to turn said receptacles from a substantially upright position therein to a substantially horizontal position on said support.

23. An apparatus of the class described comprising means for forming receptacles, means for delivering material into said receptacles, means for closing the mouths of said receptacles, means to feed said receptacles, a movable receiver adapted to receive receptacles from said feeding means, a support adjacent to said receiver, means to operate said receiver to deposit receptacles upon said support, a conveyer having pockets to receive cartons, means to operate said conveyer and retain cartons thereon opposed to said support, and means to discharge receptacles from said support into said cartons.

24. An apparatus of the class described comprising means for forming receptacles, means for delivering material into said receptacles, means for closing the mouths of said receptacles, means to feed said receptacles, a movable retainer adapted to receive receptacles from said feeding means, a support adjacent to said receiver, means to operate said receiver to deposit receptacles upon said support, a conveyer having pockets to receive cartons, means to operate said conveyer and retain cartons thereon opposed to said support, means to discharge receptacles from said support into said cartons, and means to close said cartons.

25. An apparatus of the class described comprising a hollow plunger, means within the plunger to form successive charges of material, an apertured member and supplemental members opposing the plunger adapted to coact therewith to form sheets of material into receptacles as the plunger pushes the material therebetween, said charge forming means serving to deposit charges of material in said receptacles while containing the plunger, and means to operate said plunger and charge forming means.

26. An apparatus of the class described comprising a hollow plunger, an abutment within the plunger, a shutter to coact with said abutment for providing charges of material in the plunger, means opposed to the plunger to coact therewith to form sheets of material into receptacles, means to reciprocate the plunger, means to operate said shutter separately from the plunger to deliver charges of material into said receptacles.

27. An apparatus of the class described comprising a hollow plunger, an abutment within the plunger, a shutter to coact with said abutment for providing charges of material in the plunger, means opposed to the plunger to coact therewith to form sheets of material into receptacles, means to reciprocate the plunger, means to operate said shutter separately from the plunger to deliver charges of material into said receptacles, and a stop adjacent to said shutter to regulate the volume of such charges.

28. An apparatus of the class described comprising a hollow plunger, means within the plunger to form successive charges of material, means opposing the plunger adapted to coact therewith to form sheets of material into receptacles, said charge forming means serving to deposit charges of material in said receptacles while containing the plunger, means to operate said plunger and charge forming means, and means to vent said plunger.

29. An apparatus of the class described comprising a hollow plunger, an abutment within the plunger, a shutter to coact with said abutment for providing charges of material in the plunger, means opposed to the plunger to coact therewith to form sheets of material into receptacles, means to reciprocate the plunger, means to operate said shutter separately from the plunger to deliver charges of material into said receptacles, said plunger having a vent leading through its side wall, and having a vent communicating with the interior of the plunger above the charge forming means.

30. Charge forming means comprising a plunger, an abutment within the plunger, a shutter to coact with said abutment to provide a charge of material in the plunger, means to operate said shutter, and means coactive with the plunger for forming receptacles.

31. Charge forming means comprising a plunger, an abutment within the plunger, a shutter to coact with said abutment to provide a charge of material in the plunger, means to operate said shutter, a stop adjacent to the shutter to regulate the volume of the charges within the plunger, and means coactive with the plunger for forming receptacles.

32. Charge forming means comprising a plunger, an abutment within the plunger, a shutter to coact with said abutment to provide a charge of material in the plunger, means to operate said shutter, means to vent the plunger, and means coactive with the plunger for forming receptacles.

33. Charge forming means comprising a plunger, an abutment within the plunger, a shutter to coact with said abutment to provide a charge of material in the plunger, means to operate said shutter, said plunger having a vent leading through its side wall and having a vent communicating with the interior of the plunger above the charge forming means, and means coactive with the plunger for forming receptacles.

34. An apparatus of the class described comprising a hollow plunger, means within the plunger to form successive charges of material, a plate opposed to the plunger provided with an opening to receive the plunger and having other openings communicating with the first named opening, means to feed sheets of material upon the plate beneath the plunger, and supplemental members beneath the first named opening in the plate adapted to receive the plunger and sheet of material to fold the latter around the plunger as the plunger passes between said members.

35. An apparatus of the class described comprising a conveyer having pockets, means for feeding collapsed cartons into said pockets, an opener adapted to enter said cartons, means for inserting the opener in and removing it from the cartons, and means for rotating the opener while in the cartons.

36. An apparatus of the class described comprising a conveyer having pockets, means for feeding collapsed cartons into said pockets, an opener adapted to enter said cartons, and means for inserting the opener in and rotating it within the cartons to open and seat them in the pockets and for removing the opener from the cartons.

37. An apparatus of the class described comprising a conveyer having pockets, means for feeding collapsed cartons into said pockets, an opener adapted to enter said cartons, a reciprocative shaft carrying said opener, and means to rotate said shaft while the opener is within the carton for opening the latter.

38. An apparatus of the class described comprising a conveyer having pockets, means for feeding collapsed cartons into said pockets, an opener adapted to enter said cartons, a reciprocative shaft carrying said opener, a pin connected with said shaft, a grooved member receiving said pin, and means to reciprocate said shaft whereby the opener may enter cartons and rotate therein to open the same and be withdrawn therefrom.

39. In an apparatus of the class described, a carton receiver, a carton opener, means for inserting the opener within the cartons, means for operating the opener while within said cartons to open and seat cartons in said receiver, and means to withdraw the opener from an opened carton leaving the latter opened in the receiver.

40. An apparatus of the class described comprising a conveyer having receivers for cartons, means to successively feed cartons into said receivers, means to operate the conveyer step by step, means to open and seat cartons in said receivers, means to close flaps at one end of the cartons, means to insert material in the opposite ends of the cartons, means to close flaps at the last named ends of the cartons, means to apply adhesive to unclosed flaps, and means to close and seal said flaps.

41. An apparatus of the class described comprising a conveyer having receivers for cartons, means to successively feed cartons into said receivers, means to operate the conveyer step by step, means to open and seat cartons in said receivers, means to close flaps at one end of the cartons, means to insert material in the opposite ends of the cartons, means to close flaps at the last named ends of the cartons, means to apply adhesive to unclosed flaps, means to close and seal said flaps, and means for removing the cartons step by step as discharged from the conveyer.

42. An apparatus of the class described comprising a conveyer having receivers for cartons, means to successively feed cartons into said receivers, means to operate the conveyer step by step, means to open and seat cartons in said receivers, means to close flaps at one end of the cartons, means to insert material in the opposite ends of the cartons, means to close flaps at the last named ends of the cartons, means to apply adhesive to unclosed flaps, means to close and seal said flaps, resilient fingers adapted to engage cartons as discharged from the receiver, and means to reciprocate said fingers to discharge cartons step by step.

43. An apparatus of the class described comprising a conveyer having receivers for cartons, means to successively feed cartons into said receivers, means to operate the conveyer step by step, means for opening cartons in the receivers, means to insert material in the cartons, means to close flaps at opposite ends of the cartons, means for applying adhesive to flaps of the cartons, and means to operate said last named means in a direction substantially at right angles to the travel of the cartons with the conveyer.

44. An apparatus of the class described comprising a conveyer having receivers for cartons, means to successively feed cartons into said receivers, means to operate the conveyer step by step, means for opening cartons in the receivers, means to insert material in the cartons, means to close flaps at opposite ends of the cartons, means for reversing flaps relatively to the cartons, and means for applying adhesive to said flaps while in such reversed positions.

45. An apparatus of the class described comprising a conveyer having receivers for cartons, means to successively feed cartons into said receivers, means to operate the conveyer step by step, means for opening cartons in the receivers, means to insert material in the cartons, means to close flaps at opposite ends of the cartons, means for reversing flaps relatively to the cartons, pasters having angularly disposed surfaces adapted to apply adhesive to said reversed flaps, and means to operate said pasters.

46. An apparatus of the class described comprising a conveyer having receivers for cartons, means to successively feed cartons into said receivers, means to operate the conveyer step by step, means for opening cartons in the receivers and leaving flaps of the cartons projecting outwardly, means to insert material in the cartons, means for reversing flaps relatively to the cartons, and means for applying adhesive to said reversed and outwardly projecting flaps.

47. An apparatus of the class described comprising a conveyer having receivers for cartons, means to successively feed cartons into said receivers, means to operate the conveyer step by step, means for opening cartons in the receivers and leaving flaps of the cartons projecting outwardly, means to insert material in the cartons, means for reversing flaps relatively to the cartons, pasters having angularly disposed surfaces to apply paste to the reversed flaps and other surfaces to apply paste to the outwardly projecting flaps, and means to operate said pasters.

48. An apparatus of the class described comprising a conveyer having receivers for cartons, means to successively feed cartons into said receivers, means to operate the conveyer step by step, means adjacent to the conveyer at one end of the cartons to prevent their displacement from said receivers, means to open and seat cartons in said receivers, means to insert material in said cartons, and means to close flaps of said cartons.

49. An apparatus of the class described comprising a conveyer having receivers for cartons, means to successively feed cartons into said receivers, means to operate the conveyer step by step, means in the path of cartons to engage and position them in said receivers, means to open and seat such positioned cartons in said receivers, means to insert material in said opened cartons, and means to close said cartons.

50. An apparatus of the class described comprising means for forming receptacles, means for charging material into said receptacles, means for closing said receptacles, means for delivering and opening collapsed cartons, means for inserting said charged and closed receptacles into said opened cartons, and means for closing said cartons.

51. An apparatus of the class described comprising a carton opener, means for inserting the opener within cartons, means to rotate the opener while within cartons to expand the latter, and means to retain cartons bridged between spaced supports in position to receive the opener.

52. An apparatus of the class described comprising a carton opener, means for inserting the opener within cartons and withdrawing the opener from opened cartons, means to rotate the opener while within cartons to expand the latter, and means to retain cartons suspended between their edges in position to receive the opener.

53. An apparatus of the class described comprising means to retain cartons a carton opener, means for inserting the opener within cartons and withdrawing the opener from opened cartons, means to rotate the opener while within cartons to expand the latter, and means to move the cartons from their retaining means after the opener has been removed from the cartons.

54. An apparatus of the class described comprising a carton opener, means to retain a carton temporarily in position opposed to said opener, means to insert the opener in such carton, means to rotate the opener while in such carton to expand the latter and withdraw the opener from the expanded carton, and means to insert an article within such expanded carton.

55. An apparatus of the class described comprising a carton opener, means to retain a carton temporarily in position opposed to said opener, means to insert the opener in such carton, means to rotate the opener while in such carton to expand the latter and withdraw the opener from the expanded carton, means to insert an article within such expanded carton, means to move the charged carton, and means to close such carton.

56. An apparatus of the class described comprising a carton opener, means to retain a carton in position to receive said opener, means to insert the opener within the carton, means to rotate the opener against a side of the carton to cause expansion of the latter, means to separate the opener from the carton, and means to charge such opened carton.

57. An apparatus of the class described comprising a carton opener, means to retain a carton in position to receive said opener, means to insert the opener within the carton, means to operate the opener while within the carton to cause expansion of the latter, means to separate the opener from the carton, means to move the carton from the opener receiving position, and means to charge such opened carton.

58. A machine of the class described comprising a carton opener, a retainer to retain a collapsed carton opposite said opener, means to insert the opener within the carton, means to cause the opener to open the carton while within said retainer, means to retain an article in position to be inserted in said opened carton, and means to insert such article in said carton while the latter is in said retainer.

59. A machine of the class described comprising a carton receiver having a fixed wall and a carton support spaced therefrom, a carton opener, means for inserting the opener within cartons within said receiver while resting against said support, and means to cause said opener to operate within the cartons to drag the cartons from said support.

In testimony whereof I hereunto affix my signature in the presence of two witnesses.

ERNEST D. ANDERSON.

Witnesses:
    THOMAS A. HILL,
    LOUISE ENDERLE.